United States Patent [19]

de Kock

[11] Patent Number: 4,671,110

[45] Date of Patent: Jun. 9, 1987

[54] LEVEL SENSING DEVICE

[76] Inventor: Michiel D. de Kock, 144 Roedolf Avenue, Clubview East, 0140 Verwoerdburg, South Africa

[21] Appl. No.: 805,535

[22] Filed: Dec. 6, 1985

[30] Foreign Application Priority Data

Dec. 6, 1984 [ZA] South Africa ..................... 84/9495
May 3, 1985 [ZA] South Africa ..................... 85/3311

[51] Int. Cl.$^4$ ....................... G01F 23/02; G01F 23/24
[52] U.S. Cl. .................................. 73/323; 73/304 R
[58] Field of Search ................. 73/323, 749, 304 R; 361/284; 338/308

[56] References Cited

U.S. PATENT DOCUMENTS

| | | | |
|---|---|---|---|
| 2,743,340 | 4/1956 | Zoltanski | 73/749 X |
| 3,190,122 | 6/1965 | Edwards | 73/749 |
| 3,955,039 | 5/1976 | Roschy et al. | 338/308 X |
| 4,002,996 | 1/1977 | Klenanoff | 340/620 X |
| 4,039,997 | 8/1977 | Huang et al. | 338/308 |

Primary Examiner—Daniel M. Yasich
Attorney, Agent, or Firm—Millen & White

[57] ABSTRACT

The invention provides a level sensing device for sensing the level of an electrically conductive liquid in a vessel or container, the level being determined both by visual observation of the level of the liguid in a sight glass which is in communication with the interior of the vessel, and by detecting the level of the liquid in the sight glass by the use of an electrically conductive layer on at least one of the interior and exterior surfaces of the sight glass. The device provides a warning alarm when the level of the liquid drops below or exceeds a predetermined low or high level in the vessel.

4 Claims, 4 Drawing Figures

LEVEL SENSING DEVICE

INTRODUCTION

This invention relates to a sensing device. It relates more particularly to a level sensing device for sensing the level of an electrically conductive liquid in a vessel or container and to an apparatus adapted to indicate, record and/or control the level of liquid in the vessel or container in conjunction with associated indicating, recording and/or controlling means. The invention further relates to a sensing device for sensing the level of an electrically conductive liquid in a vessel which is equipped with a gauge glass or sight glass to give a visual indication of the level of liquid within the vessel or container, and an alarm when the level of such liquid either falls below or rises above predetermined positions in the sight glass.

BACKGROUND OF THE INVENTION

Sight or gauge glass level indicators are widely used to provide a visual indication of water level in for instance, steam boilers. For safety reasons it is compulsory, in most countries, for steam boiler installations to be provided with sight glasses of the aforementioned type, irrespective of whether such boiler installations comprise level sensing and/or controlling apparatus. This is considered essential because automatic sensing devices are subject to mechanical and/or electrical failure and in the event of such failure, it is argued, it should still be possible to visually verify the level indicated by a sensing device.

Various types of level sensing devices are known to the applicant. Thus for instance, float operated, capacitative, reflector type, conductivity probe type and other types of level sensing devices are available on the market. However, many of these devices are incapable of being used in conjunction with a visual sight glass.

OBJECTS AND SUMMARY OF THE INVENTION

The invention has as an object to provide a level sensing device by means of which the level of an electrically conductive liquid in a vessel can be determined both by visual observation of the level of said liquid in a sight glass which is in communication with the interior of the vessel, and by detection of the level of the liquid in the sight glass by the use of an electrically conductive layer on at least one of the interior and exterior surfaces of the sight glass.

It is a further object of the invention to provide a level sensing device which is adapted to provide a warning alarm when the level of an electrically conductive liquid in a vessel either drops below or exceeds a predetermined low or high level in the vessel.

According to one aspect of the invention, there is provided a level sensing device for sensing the level of an electrically conductive liquid in a vessel or container, comprising:
 a transparent tubular sight glass,
 a conduit for communication between the bore of the sight glass and the vessel or container,
 a layer of a conductive material applied to one of the internal and external surfaces of the sight glass,
 a first conductor for electrical connection of the layer to an electric circuit, and
 a second conductor for electrical connection of the liquid to the electric circuit,
 the conductive layer constituting an electrical impedance in the electric circuit, the value of the impedance being related to the level of the liquid in the sight glass.

The term "impedance" in this specification is to be interpreted as including both capacitive and resistive impedance.

The electrically conductive layer may be provided longitudinally along at least a portion of the length of the sight glass. It may be opaque or transparent. However, when it is opaque, it should preferably not cover the entire circumference of the sight glass, but leave uncovered at least a longitudinal slot along the length of the sight glass, so as to permit visual observation of the level of the liquid therein.

It has been found by the applicant that a thin layer of a material such as stannous oxide can be deposited on one or more of the interior or exterior surfaces of a sight glass, which layer surprisingly offers excellent transparency characteristics for visual observance of the level of the liquid in the sight glass, whilst still remaining electrically conductive.

In a preferred embodiment of the invention, the conductive layer is applied to the internal surface of the sight glass between at least a first position in the sight glass corresponding to a low level of the liquid in the vessel or container, and a second position in the sight glass corresponding to a high level of said liquid, the layer being adapted to be in continuous electric contact with the liquid for variations in level of said liquid between said first and second positions, the layer constituting a resistive impedance in the electric circuit, the layer's resistance being variable in accordance with variations in the level of the liquid in the sight glass.

In another embodiment of the invention, the conductive layer is applied to the external surface of the sight glass, the layer constituting one plate of a capacitive impedance in the electric circuit, the liquid in the sight glass forming the other plate of the capacitive impedance, the glass wall of the sight glass constituting the dielectric medium of the capacitor so formed, the capacitance of the impedance being variable in accordance with variations in the level of said liquid in the sight glass.

In accordance with a further aspect of the invention, a sensing device for sensing the level of an electrically conductive liquid in a container or vessel comprises:
 a non-conductive wall having a conductive layer deposited thereon, the conductive layer being adapted to be in continuous electric contact with the liquid for variations in its level between at least a first position corresponding to a low level in the vessel or container, and a second position corresponding to a high level in the vessel or container,
 means for applying an electromotive force between the liquid and the layer, and
 means for measuring the combined resistance of the liquid and a portion of the layer, the portion being between the level of the liquid and a point above the second position.

In accordance with another embodiment of the invention, a sensing device for sensing the level of an electrically conductive liquid in a container or vessel comprises:
 a dielectric component having a conductive surface electrically isolated from the liquid and a non-conductive surface spaced from the conductive surface and being adapted to be in continuous electric contact with the liquid for variations in its level between at least a low and a high level, the component constituting a capacitor of which one plate is represented by the conductive surface and the other by the liquid, means for applying an electromotive force between the liquid and the conductive surface, and means for detecting a variation in the capacitance of the capacitor.

BRIEF DESCRIPTION OF THE DRAWINGS

The invention is now described, by way of example, with reference to the attached drawings in which.

DETAILED DESCRIPTION OF THE DRAWINGS AND PREFERRED EMBODIMENTS

Figure 1:
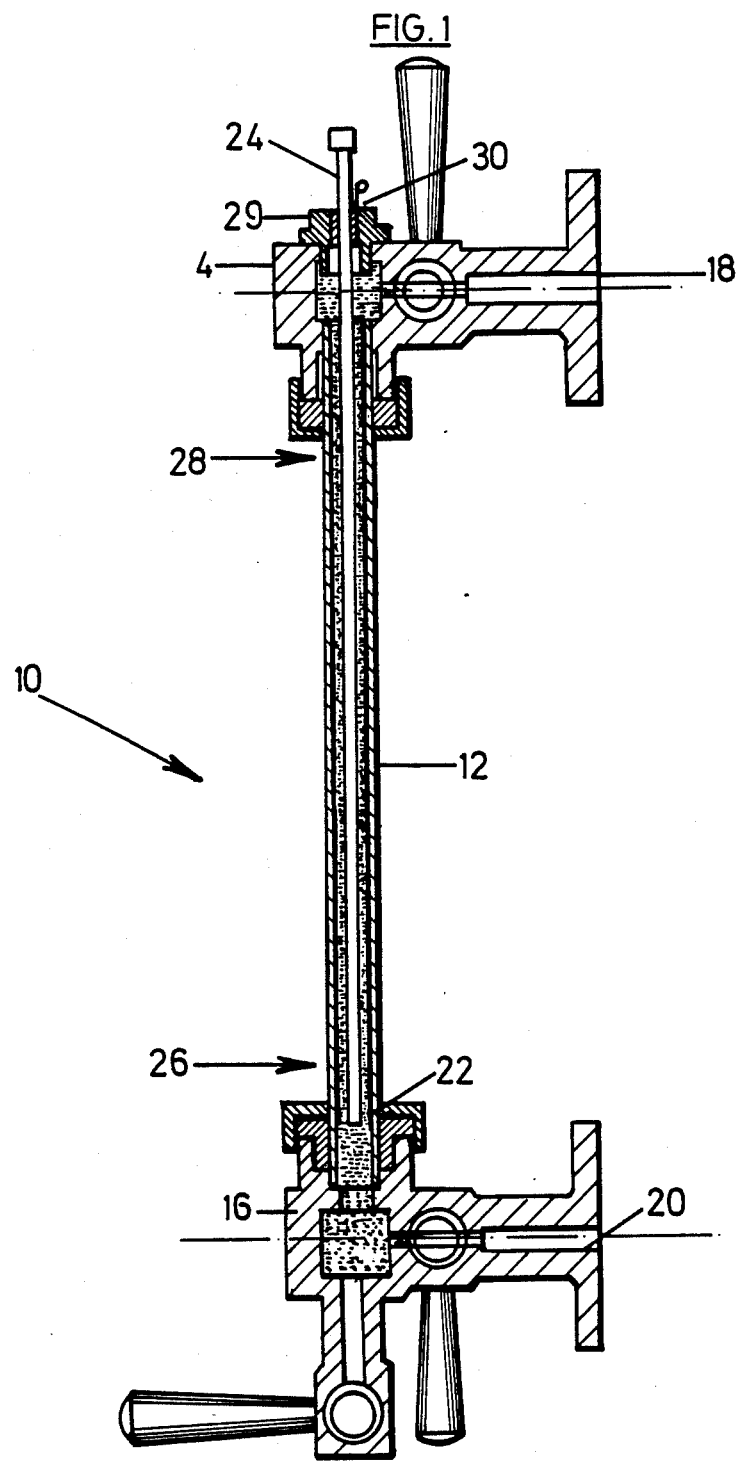
FIG. 1 shows a part sectional side elevation of a sight glass attachable to a vessel and forming part of one embodiment of a sensing device in accordance with the invention.

Referring to FIG. 1, reference numeral 10 generally indicates a portion of a sensing device for sensing the level of an electrically conductive liquid such as water in, for example, a steam boiler (not shown). The device 10 is mounted on the outside of the boiler and comprises a cylindrical tubular sight glass 12 held between a top connecting member 14 and a bottom connecting member 16, the members 14, 16 having conduits 18, 20 respectively for communication between the bore of the sight glass 12 and the interior of the boiler.

The length of the sight glass 12 and the position in which it is mounted to the boiler are selected such as to permit the sight glass 12 to indicate the desired normal operating level of water in the boiler about halfway between the members 14, 16. Furthermore, the sight glass 12 should be of sufficient length as to enable it to indicate a minimum operating level 26 and a maximum operating level 28 respectively below and above the normal operating level.

A thin transparent conductive coating 22 is deposited on the internal surface of the sight glass 12 along the length and circumference thereof.

A brass rod 24 is mounted in the connecting member 14 in such a way as to extend along the centre line of the sight glass 12. The rod 24 is held in position in the connecting member 14 by means of an insulating plug 29 electrically insulating the rod 24 from the connecting member 14. The rod 24 extends to beyond the top surface of the connecting member 14 and is connectable to an alectric circuit 100 (see FIG. 2).

The top end of the layer 22 is electrically connected to the circuit 100 via a spring-loaded terminal 30 extending through the plug 29. The lower end of the terminal 30 makes a sliding contact with the layer 22 so as to ensure continuous contact when the plug 29 is screwed in or out. The rod 24 and the sight glass 12 should be mounted such as to prevent contact between the rod 24 and the layer 22.

The rod 24 has a low electrical resistance whilst the conductive layer 22 has a relatively high electrical resistance. As the level of water which should contain a sufficient amount of inorganic ions, rises or falls within the sight glass 12, a greater or smaller area of the conductive layer 22 is covered. With the water providing an electrical connection between the metal rod 24 and the conductive layer 22, the combined resistance of the rod 24, the water and the conductive layer 22 is decreased or increased with increasing or decreasing water level inside the sight glass 12.

By applying a substantially constant voltage across the rod 24 and the conductive layer 22, the resulting current may be employed in the electric circuit 100, for instance to provide an indication of the level in the sight glass 12 and/or to actuate high and low level warning alarms, under appropriate circumstances.

The circuit 100 comprises a variable resistance in the form of the combination of the water and the conductive layer 22 in the sight glass 12. The layer 22 is connected in series with a resistance 102 in potentiometer mode and direct current power source 104. A rise or fall of water level in the sight glass 12 results in a corresponding decrease or increase in the effective resistance of the layer 22 which in turn results in a corresponding signal tapped off from the resistance 102, the voltage of the signal increasing or decreasing in accordance with increasing or decreasing level in the sight glass 12. The circuit 100 is powered by a 12 V DC power source 106. The signal from the resistance 102 is fed to a dual pack IC LM 358N comprising a buffer 108 and an amplifier 110. The output from pin 7 of the amplifier 110 is fed to a 4 to 24 mA recording instrument 112 for continuous recording of the water level. The output from pin 1 of the buffer 108 is fed to a second dual pack IC LM 358N comprising two comparators 114 and 116 connected as shown with relays 118 and 120 (for low and high level) from pins 1 and 7 respectively. The contacts of the relays 118 and 120 are not shown. The pick up points of the relays 118 and 120 in relation to water level in the sight glass 12 are adjustable by means of potentiometers 122 and 124. The relays 118 and 120 are equipped with normally open and normally closed contacts, for instance, for the operation of an alarm or a pump, a solenoid, an indicating light or other controlling or indicating devices.

Referring to FIG. 1, positions 26 and 28 may be selected on the sight glass 12 in respect of which low and high level alarms may be required to be given by the relays 118 and 120. As the water level within the sight glass 12 rises and reaches the position 26, the relay 118 will drop out and remain de-energised for all positions of the water level within the sight glass 12 above the position 26. For any position of the water level below the level 26 the relay 118 will be energised and by connecting a low level alarm (not shown) to the normally open contacts on the relay 118, a low level alarm may be actuated and such alarm will remain actuated for all positions of the water level below the level 26. Similarly, the relay 120 may be actuated via the comparator 116 in such a way as to become energised when the water level within the sight glass 12 rises to point 28. The relay 120 will remain energised for all levels above the position 28 and will be de-energised for all positions of water level below the level 28. By the utilisation of normally open contacts on the relay 120 a high level alarm will be actuated when the water level rises to the level 28 and will remain actuated for all positions of the water level above the level 28.

Figure 2:
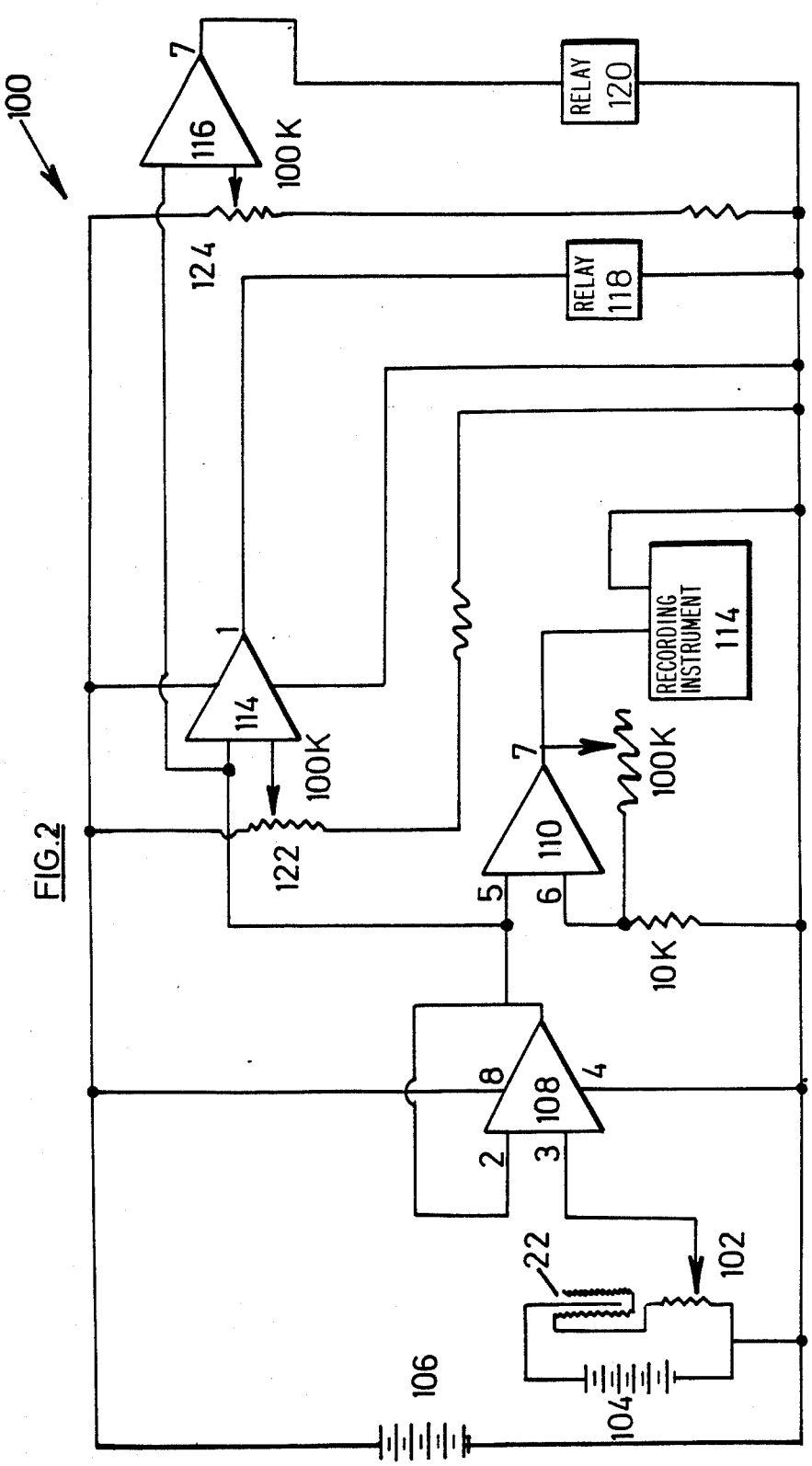
FIG. 2 shows a schematic circuit diagram for use with the sight glass shown in FIG. 1.

The direct current power sources shown as batteries in the circuit diagram in FIG. 2 may optionally be replaced by a rectified and smoothed alternating current supply.

Figure 3:
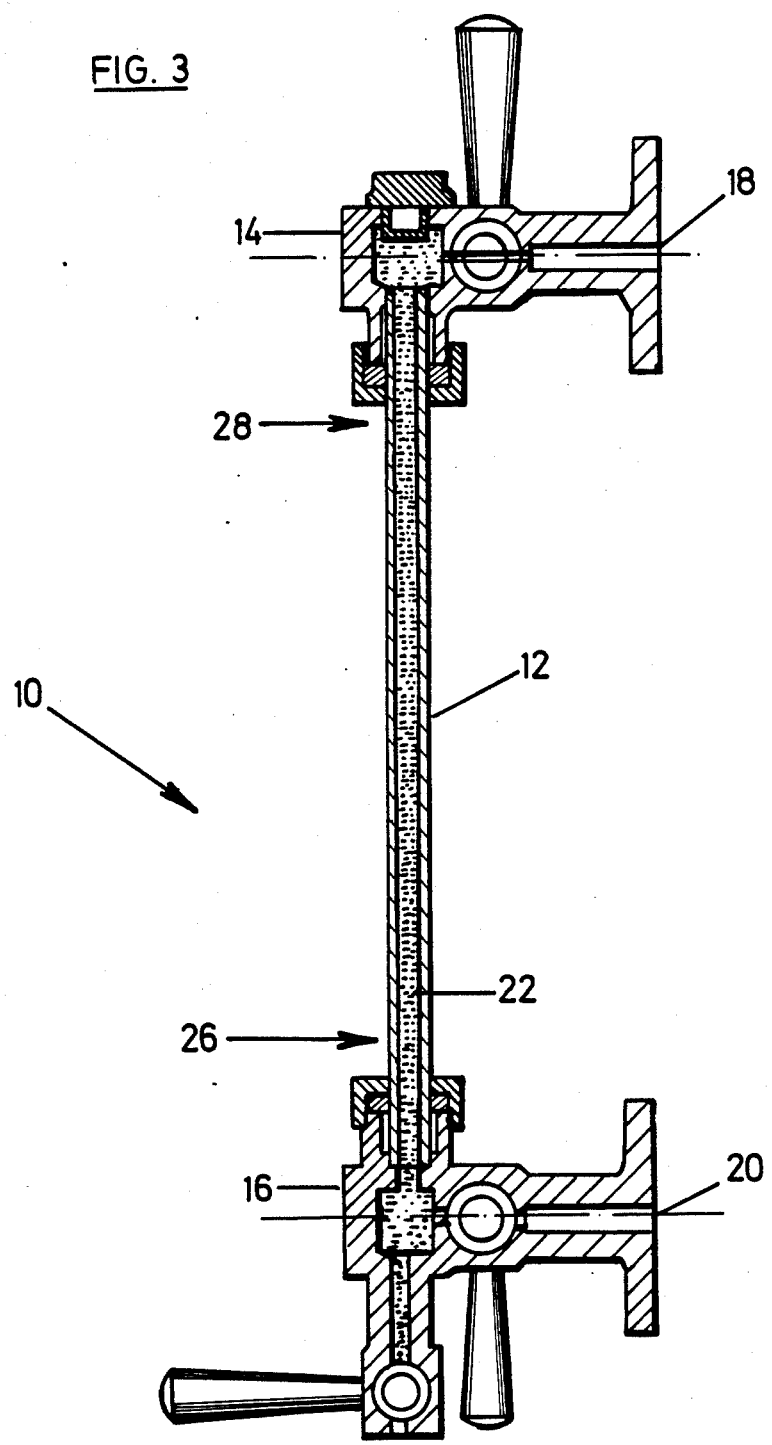
FIG. 3 shows a part sectional side elevation of a sight glass attachable to a vessel and forming part of another embodiment of a sensing device in accordance with the invention.
Figure 4:
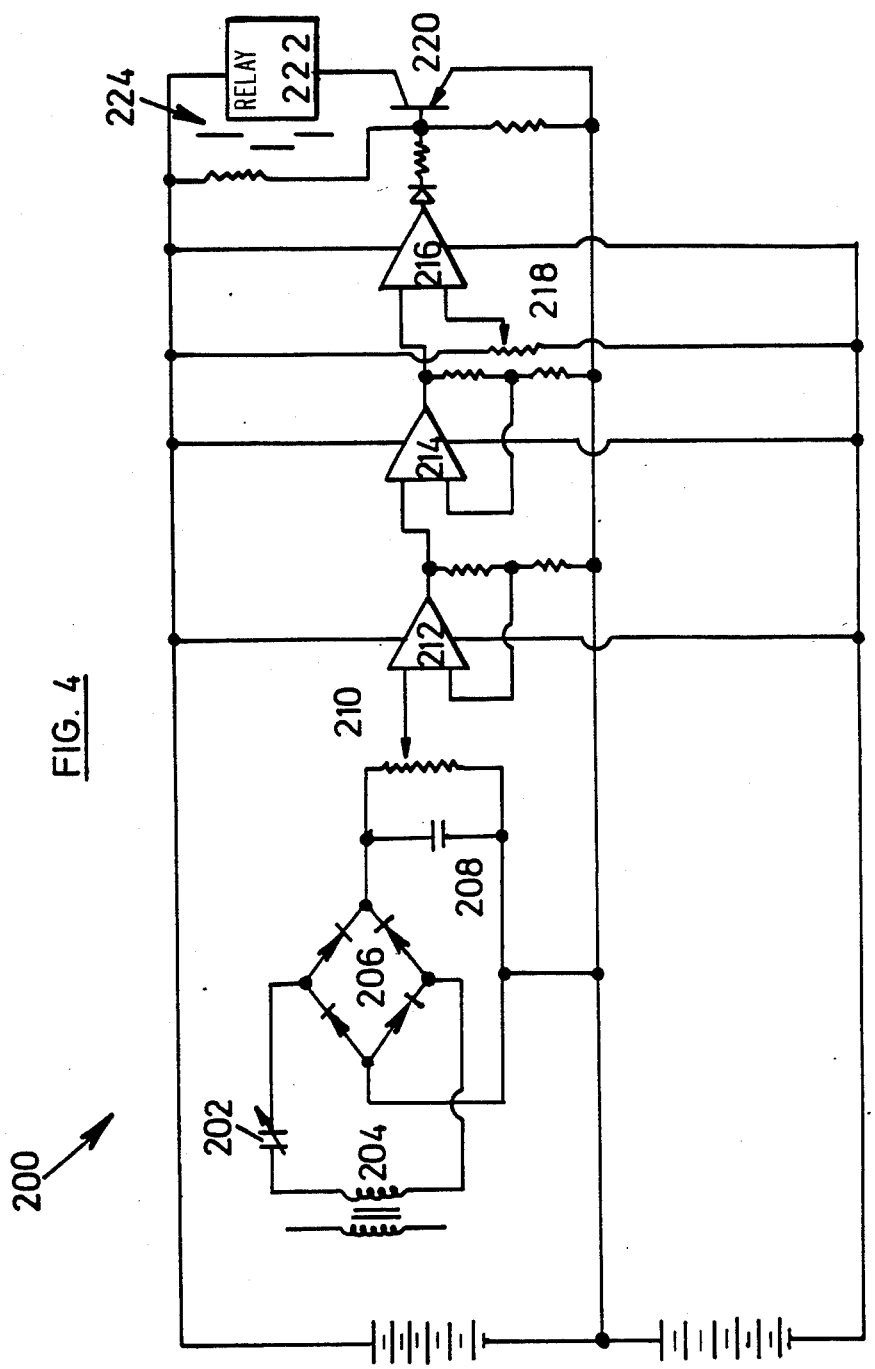
FIG. 4 shows a schematic circuit diagram for use with the sight glass shown in FIG. 3.

In FIG. 3 an alternative to the sight glass 12 iof FIG. 1 is shown. Like reference numerals in FIGS. 1 and 3 refer to like parts. However, it will be noticed that the sight glass 12 shown in FIG. 3 does not comprise a rod 24 and, moreover, the electrically conductive layer 22 is applied to the exterior surface of the sight glass 12 and not to the interior surface thereof as in FIG. 1. The thin transparent conductive layer 22 constituting one plate of an electrical impedance in the form of a capacitor 202 extends along the length and circumference of the sight glass 12 and terminates about 5 mm from the connectors 14, 16 holding the sight glass 12 at its two ends. The layer 22 is electrically connected to an electric circuit arrangement 200 (as is shown in FIG. 4).

The deposition of the transparent conductive layer 22 on the sight glass 12 may be achieved by heating tin chloride powder (either stannous or stannic chloride) in a flask (not shown) until fumes are produced. Oxygen is then blown into the flask, for example, at a rate of 1 to 5 liters per minute. The oxygen reacts with the tin chloride to form tin oxide fumes which are fed from the flask into a furnace (not shown), held for example at approximately 500° C. The fumes are deposited onto the inside surface of the sight glass 12 for the FIG. 1 embodiment and onto the outside surface of the sight glass 12 for the FIG. 3 embodiment.

The surface to be coated is prepared by etching it, for example, with hydrofluoric acid of about 3% strength for about 60 seconds. The thickness of the tin oxide layer need not be more than a few microns, depending on the resistance required and may be gauged and checked by means of interference patterns of different colours formed by the reflection of light from the coated surface.

Provided the water in the sight glass 12 has been rendered conductive, it will act as the other plate of the capacitor 202. As the water level in the sight glass 12 rises or falls, the capacitance of the capacitor 202 is increased or decreased as a result of a larger or smaller portion of the interior surface of the sight glass 12 being covered by the water. The said increases and decreases in capacitance are used in the circuit 200 to provide a signal corresponding to the water level in the sight glass 12.

In the circuit 200, the capacitor 202 is shown connected in series with an alternating current power source 204 which in turn is connected to a rectifier 206 whose direct current output is smoothed by a further capacitor 208 and fed through a potentiometer 210 to a series of operational amplifiers 212 and 214. The amplified signal from the amplifier 214 is then fed to a comparator 216 with adjustable reference to provide an adjustable trigger point for the capacitor 202. The reference is provided by means of a further adjustable potentiometer 218. The output of the comparator 216 is used to control a switching element in the form of a transistor 220 which is shown connected in series with a relay 222 equipped with normally closed contacts 224 for controlling an alarm (not shown) to indicate a condition of low or high water level in the sight glass 12.

Referring to FIG. 3, a position 26 is selected on the sight glass 12 wherein a low water condition may be indicated by an alarm for any level below the position 26. The potentiometer 218 is adjusted so that the output from the amplifier 214 will match the reference voltage of the comparator 216 when the level of water within the sight glass 12 reaches the position 26. For any level below the position 26, the reactance of the capacitor 202 will produce an insufficient output from the amplifier 214 to trigger the transistor 220. The relay 222 will therefore remain de-energised until the water level reaches the position 26 when the reactance of the capacitor 202 will cause a sufficient output to be produced from the amplifier 214 to energise the transistor 220, which will in turn cause the relay 222 to be energised thereby opening the normally closed contacts 224 and cancelling the low level alarm. By employment of a normally open contact (not shown) on the relay 222, the circuit 200 may be utilised to actuate the alarm to indicate a high water level condition such as a level at or above a position 28 in FIG. 3. The reference potentiometer 218 should be suitably adjusted to provide the desired reference corresponding to the high level condition.

It will be appreciated that a plurality of comparators and associated switching components may be employed to provide additional facilitates for indicating, recording and/or controlling the level of water in a boiler or the like to which the sight glass 12 is connected.

It will also be appreciated that the signal produced by the capacitor 202 may be utilised in any number of different methods with respect to circuit design and principle of operation to achieve the desired end result.

EXAMPLE 1

A thin transparent stannous oxide layer was applied to the internal surface of a 600 mm long glass tube having an internal diameter of 12.5 mm and an outside diameter of 19 mm. Prior to the deposition of the stannous oxide layer, the surface was etched by subjecting it to a 3% hydrofluoric acid solution for about 30 seconds.

Uniformity of thickness of the stannous oxide layer was achieved by measuring the electrical resistance thereof between one end of the tube and various points along its length, and by removing excess stannous oxide by means of emery paper wrapped around and glued to a rod driven by a power drill. In this way a uniform resistance of about 30 Kohm was obtained between the two ends of the tube. A rubber bulb was attached to one end of the tube and a 6 mm diameter brass rod having a length of about 650 mm was positioned centrally within the glass tube, without touching the internal surface of the tube.

The top end of the stannous oxide layer was connected in series to a 20 Kohm resistance which in turn was connected to the positive terminal of a 12 V power supply. The brass rod was connected via an avometer to the negative terminal of the power supply.

An oscilloscope was used to measure the voltage drop over the 20 Kohm resistance.

Samples of blow-down water from two boilers at each of two different power stations in the vicinity of Pretoria were introduced into the apparatus. The samples were numbered A1, A2, 1 and 5.

The water level in the tube was raised or lowered by squeezing or releasing the rubber bulb.

The voltage drop V (in volts) over the 20 Kohm resistance and the current I flowing in the circuit were measured for three different levels of water in the tube (low, medium, high). The combined resistance of the stannous oxide layer and the water column was then calculated by using Ohm's law (V=IR). The conductivity C (in micromho per cm) of each of the different samples was also measured. The following results were obtained:

|  | low | medium | high |
|---|---|---|---|
| Sample A1 (conductivity C = 216) |  |  |  |
| V | 2,9 | 5,6 | 7,7 |
| I | 0,15 | 0,28 | 0,39 |
| R | 60,7 | 22,9 | 11,0 |
| Sample A2 (conductivity C = 102) |  |  |  |
| V | 3,2 | 5,5 | 7,8 |
| I | 0,16 | 0,27 | 0,39 |
| R | 55,0 | 24,1 | 10,8 |
| Sample 1 (conductivity C = 360) |  |  |  |
| V | 2,2 | 5,5 | 7,7 |
| I | 0,11 | 0,27 | 0,39 |
| R | 87,1 | 20,6 | 11,2 |
| Sample 5 (conductivity C = 246) |  |  |  |
| V | 2,1 | 5,4 | 7,8 |
| I | 0,11 | 0,27 | 0,39 |
| R | 90,0 | 24,4 | 10,8 |

EXAMPLE 2

An experiment was conducted to simulate a sensing device as hereinbefore described, employing a 126 mm long glass tube having a wall thickness of 1.4 mm and covered on the outside with a thin conductive layer of tin oxide (its thickness was unknown but it provided unimpaired observance of the water level). A rubber bulb was attached to the bottom end of the tube. The bulb was filled with domestic tap water. By squeezing the bulb, it was possible to raise or lower the water level over a distance of 108 mm. To obtain electrical contact with the water an insulated flexible conductor of which one end was bared (approximately 10 mm) was inserted into the bulb through the open top end of the glass tube. The other end of the conductor was connected to one terminal of a 220 V 50 Hz AC power supply of which the other terminal was connected in series with the conductive layer of the tube. The AC signal of this circuit was fed through a rectifier of which the output was smoothed by a 10μ F capacitor. The rectified signal was measured in a Universal Avometer 8 MK II.

The resistance of the avometer was 20,000 ohms per volt. It constituted the load to which the circuit was connected, ie 200 Kohms on the 10 V scale and 2000 Kohms on the 100 V scale.

The conductive layer 42 had a resistance of approximately 2500 ohms per centimeter.

The water on the inside and the tin oxide layer on the outside of the tube constituted the plates of a capacitor of which the dielectric was the wall of the glass tube. The capacitance of this capacitor was variable with varying water level and formed a part of the impedance of the circuit.

It was found that over a level change of 76 mm a substantially linear output variation of from 0.75 V to 2.8 V was obtained on the 10 V scale, and a variation of from 7 V to 25 V was obtained on the 100 V scale of the avometer.

I claim:

1. A level sensing device for sensing the level of an electrically conductive liquid in a vessel or container, comprising
   a transparent tubular sight glass having a bore,
   a conduit for communication between the bore of the sight glass and the vessel or container,
   a transparent layer of a conductive material applied to a selected one of the internal and external surfaces of the sight glass,
   a first conductor for electrical connection of the layer to an electric circuit, and
   a second conductor for electrical connection of the liquid to the electric circuit,
   the liquid and the conductive layer together constituting an electrical impedance in the electric circuit, the value of the impedance being variable in accordance with variations of the level of the liquid in the sight glass caused by variations of the level of the said liquid in the said container or vessel, said impedance being convertable by the electric circuit into an indication of the liquid level in the vessel or container.

2. A level sensing device as claimed in claim 1, in which the conductive layer comprises stannous oxide.

3. A level sensing device as claimed in claim 1, in which the conductive layer is applied to the internal surface of the sight glass at least between a first position in the sight glass corresponding to a low level of the liquid in the vessel or container, and a second position in the sight glass corresponding to a high level of said liquid, the layer being adapted to be in continuous electric contact with the liquid during variations in level of said liquid between said first and second positions, the first conductor being adapted to connect said circuit to said layer at a point on said layer which in use is above the second position, the portion of the layer between the level of the liquid and said point constituting a resistive impedance in the electric circuit, the resistive impedance being variable in accordance with variations in the level of the liquid in the sight glass.

4. A level sensing device as claimed in claim 1, in which the said transparent conductive layer is applied to the external surface of the sight glass, the said layer constituting one plate of a capacitive impedance in the said electric circuit, the liquid in the sight glass constituting the other plate of the capacitive impedance, the wall of the sight glass forming the dielectric medium of the capacitive impedance, the capacitance of the said capacitive impedance being variable in accordance with variations in the level of said liquid in said sight glass.

* * * * *